(12) United States Patent
Garcia Barrientos

(10) Patent No.: US 8,123,170 B2
(45) Date of Patent: Feb. 28, 2012

(54) RECOVERY AND RESCUE SYSTEM FOR AIRCRAFT

(76) Inventor: Francisco Javier Garcia Barrientos, Can Pastilla-Las Maravillas (ES)

( * ) Notice: Subject to any disclaimer, the term of this patent is extended or adjusted under 35 U.S.C. 154(b) by 306 days.

(21) Appl. No.: 12/525,009

(22) PCT Filed: Dec. 5, 2007

(86) PCT No.: PCT/ES2007/000714
§ 371 (c)(1),
(2), (4) Date: Oct. 15, 2009

(87) PCT Pub. No.: WO2008/092968
PCT Pub. Date: Aug. 7, 2008

(65) Prior Publication Data
US 2010/0044516 A1 Feb. 25, 2010

(30) Foreign Application Priority Data

Feb. 1, 2007 (ES) .................................. 200603118
Nov. 30, 2007 (ES) .................................. 200703177

(51) Int. Cl.
*B64D 17/80* (2006.01)
(52) U.S. Cl. ........................................ 244/139; 244/149
(58) Field of Classification Search ............... 244/138 R, 244/140, 139, 147, 148, 149
See application file for complete search history.

(56) References Cited

U.S. PATENT DOCUMENTS

| 1,569,391 | A |  | 1/1926 | Pearl et al. |  |
|---|---|---|---|---|---|
| 2,324,045 | A |  | 7/1943 | Vallinos |  |
| 3,092,358 | A | * | 6/1963 | Potts, Jr. et al. | 244/147 |
| 3,129,913 | A | * | 4/1964 | Smith | 244/139 |
| 3,362,664 | A | * | 1/1968 | McElroy | 244/138 R |
| 3,622,108 | A |  | 11/1971 | Mathewson |  |
| 3,761,043 | A | * | 9/1973 | Simmons et al. | 244/138 R |
| 5,810,293 | A | * | 9/1998 | Leeki-Woo | 244/139 |
| 5,826,827 | A | * | 10/1998 | Coyaso et al. | 244/139 |
| 6,416,019 | B1 | * | 7/2002 | Hilliard et al. | 244/139 |

FOREIGN PATENT DOCUMENTS

| AU | 61324/65 | 1/1967 |
|---|---|---|
| DE | 95328 | 1/1973 |
| GB | 191309028 | 4/1914 |
| GB | 111498 | 11/1917 |
| GB | 302671 | 12/1928 |

* cited by examiner

*Primary Examiner* — Joshua Michener
*Assistant Examiner* — Keith L Dixon
(74) *Attorney, Agent, or Firm* — Hodgson Russ LLP

(57) ABSTRACT

The recovery and rescue system includes a sail (5) with rigging (10) fitted around a spreader conduit (4), with an intake and outlet nozzle, wherein a starting system (6) is provided, including mechanical (12-13) and electromechanical (17-18) opening mechanisms, in the first case operated by a manual lever (16) and in the second case operated by a button (19). Air driven through the intake of the spreading conduit (4) activates the starting system (6) in order to spread the sail (5) and by parachute means retain or brake the aircraft wherein the said system assembly is fitted. Said system can be housed inside the aircraft in a container provided for the purpose.

5 Claims, 3 Drawing Sheets

RECOVERY AND RESCUE SYSTEM FOR AIRCRAFT

OBJECT OF THE INVENTION

The present invention relates to a system capable of recovering an aircraft, in the event of engine failure thereof, rescuing the integrity of both the crew and of the aircraft.

The invention is thus situated in the field of aeronautics, particularly of light aircraft of up to 3,500 Kg, and more specifically in that of security systems and devices for said aircraft. Likewise, its application can be extended to aircraft of larger sizes, such as business jets.

BACKGROUND OF THE INVENTION

Aircraft of the type previously mentioned, i.e. those commonly called light aircraft or ultra-light aircraft, use a single engine, so that if there is a failure thereof the aircraft is left incapacitated to stay in the air, so that in a large majority of the cases, said failure consequently results in the destruction of the aircraft and the death of its crew members.

Trying to circumvent this problem, systems of emergency parachutes are known, such as those manufactured by the American company BRS (Ballistic Recovery Systems), which use solid-fuel rockets to deploy the parachutes.

These systems, of a single use, are installed inside a cartridge or box which generally is installed in the luggage compartment, although they are occasionally installed in the fuselage, but with important modifications therein.

Furthermore, said type of systems are expensive, have limits of use due to maximum velocity and are dangerous for the rescue teams, to which must be added that they use a complex firing system, and a risk stemming from the use of pyrotechnics for their firing.

DESCRIPTION OF THE INVENTION

The recovery and rescue system proposed by the invention fully resolves the previously mentioned drawbacks in a satisfactory manner, in the different aspects stated.

To do this, more specifically and in accordance with one of the characteristics of the invention, the system starts from the use of a sail, the function whereof being to brake the fall of the aircraft in the event of an emergency, but with the special feature that said sail is housed inside a casing which is exterior with respect to the fuselage of the aircraft, specifically installed modularly on the upper part of said fuselage, and respecting the aerodynamics of the aircraft.

Said casing is equipped with opening means, either manual or automatic, and the extension of the sail is produced by airflow; said sail remains attached to the central structure of the aircraft, specifically corresponding to its centre of gravity.

Said opening will be automatic, with the collaboration of an electronic system built into the control panel, although, as has just been mentioned, it can also be manual, through a mechanical system, in any case permitting a safe descent of the aircraft and its occupants until reaching ground level.

In accordance with what has just been stated, the system is materialized in a simple device, with an easy firing system, as the only mobile parts of the system are the front and rear parts of the casing, with minimal modifications in the fuselage of the aircraft. In order to compensate for the influence of the aforementioned casing in the aerodynamic characteristics of the array, said casing is of simple manufacture, which permits a single-use character, and the system is considerably safer than the conventional ones as it does not use pyrotechnics for its firing, and can even be used to abort take-offs.

In a variant of embodiment, the recovery and rescue system is mounted inside the aircraft, the extension of the sail being carried out by means of a compressed gas system.

In accordance with this alternative embodiment, the correct operation of the system will only be ensured in any of the flight conditions for which the system has been designed.

Additionally, based on this second alternative embodiment, the safety system, i.e. the recovery and rescue system, can be applied to larger aircraft, such as business jets and even other types of vehicles which could suffer accidents and require a braking system for parachutes, such as terrestrial vehicles which travel down viaducts or such like.

DESCRIPTION OF THE DRAWINGS

In order to complement the description being carried out and with the purpose of helping towards a better understanding of the characteristics of the invention, in accordance with a preferred example of practical embodiment thereof, a set of drawings is attached as an integral part of said description, wherein the following, in an illustrative and non-limitative character, has been represented.

PREFERRED EMBODIMENT OF THE INVENTION

Figure 1:
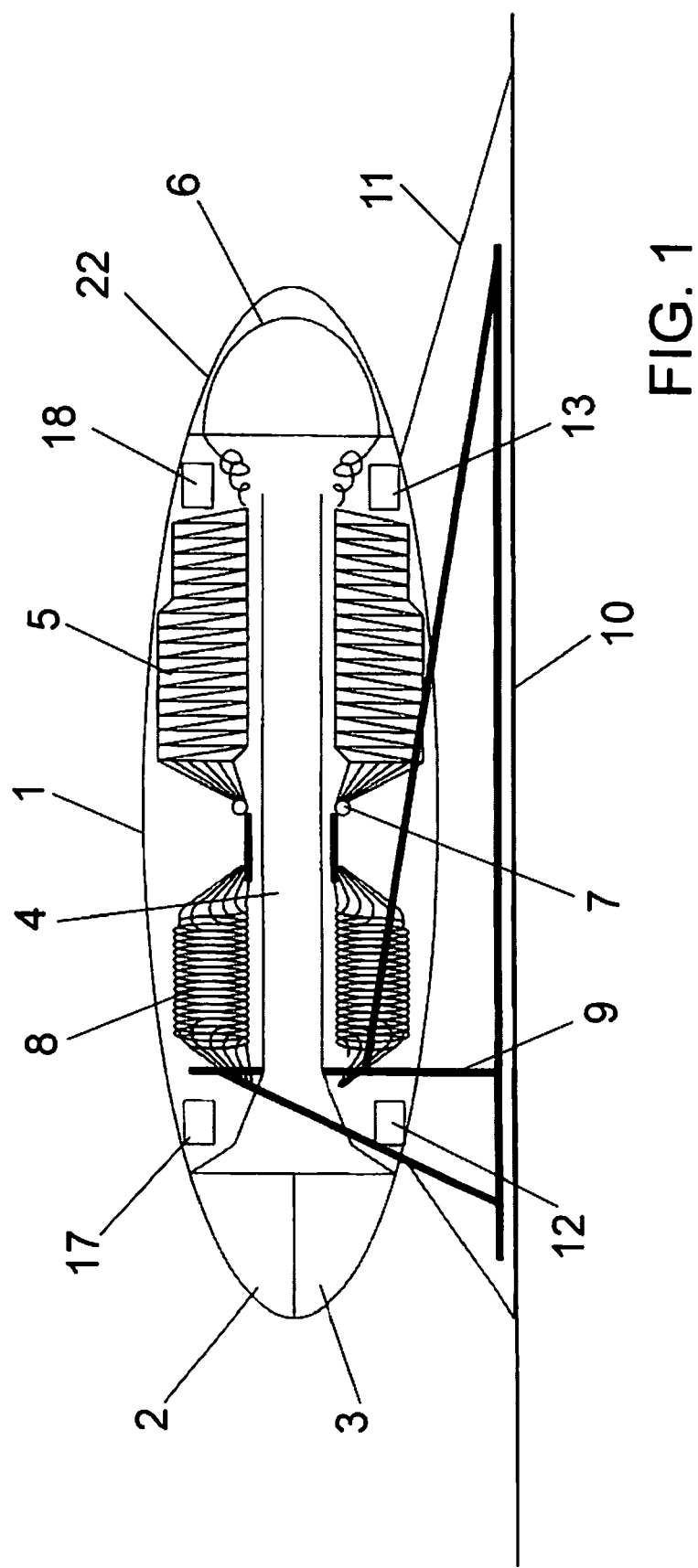
FIG. 1 shows a cross-sectioned schematic side elevational view of a recovery and rescue system for aircraft carried out in accordance with the object of the present invention, system which appears duly installed on the corresponding aircraft, only partially represented.

In view of the figures shown, and particularly of FIG. 1, it can be observed how in the system proposed there is an ellipsoidal container with a casing (1), an entrance portal (2-3) fragmented into two halves, and a spreader conduit (4), with outlet nozzle. The container or casing (1) is designed with an aerodynamic exterior nose cone to offer a minimal air resistance in the normal movement of the aircraft.

The spreader conduit (4), whereon the sail (5) is duly folded, is found in the interior of the casing or container (1), finished off at its rear end in an initiation subsystem (6) situated at the same level as the outlet conduit nozzle (4), so that when the covers (2) and (3) which constitute the entrance portal are opened, the air enters the spreader conduit (4) at a high velocity towards the nozzle, the inflation of the subsystem (6) is produced and this is propelled to the exterior of the container (1) by the force of the air that is sucked in, said sail (5) or lift propulsion initiation subsystem producing the extension thereof.

The sail or lift propulsion system (5) is finished off at its end opposite to the initiation subsystem (6) in an annular lag catch (7) which connects it to the rigging (8) which, duly rolled up, also around the spreader conduit (4), is finally fastened to a suitable point of the fixed structure, the sail (5) being adequately distanced from the aircraft.

The structure described is complemented by a support frame (9) to fasten the system as a whole to the aircraft (10), in turn hidden by a shroud (11) which connects the container (1) to said aircraft (10), as also observed in FIG. 1.

Figure 2:
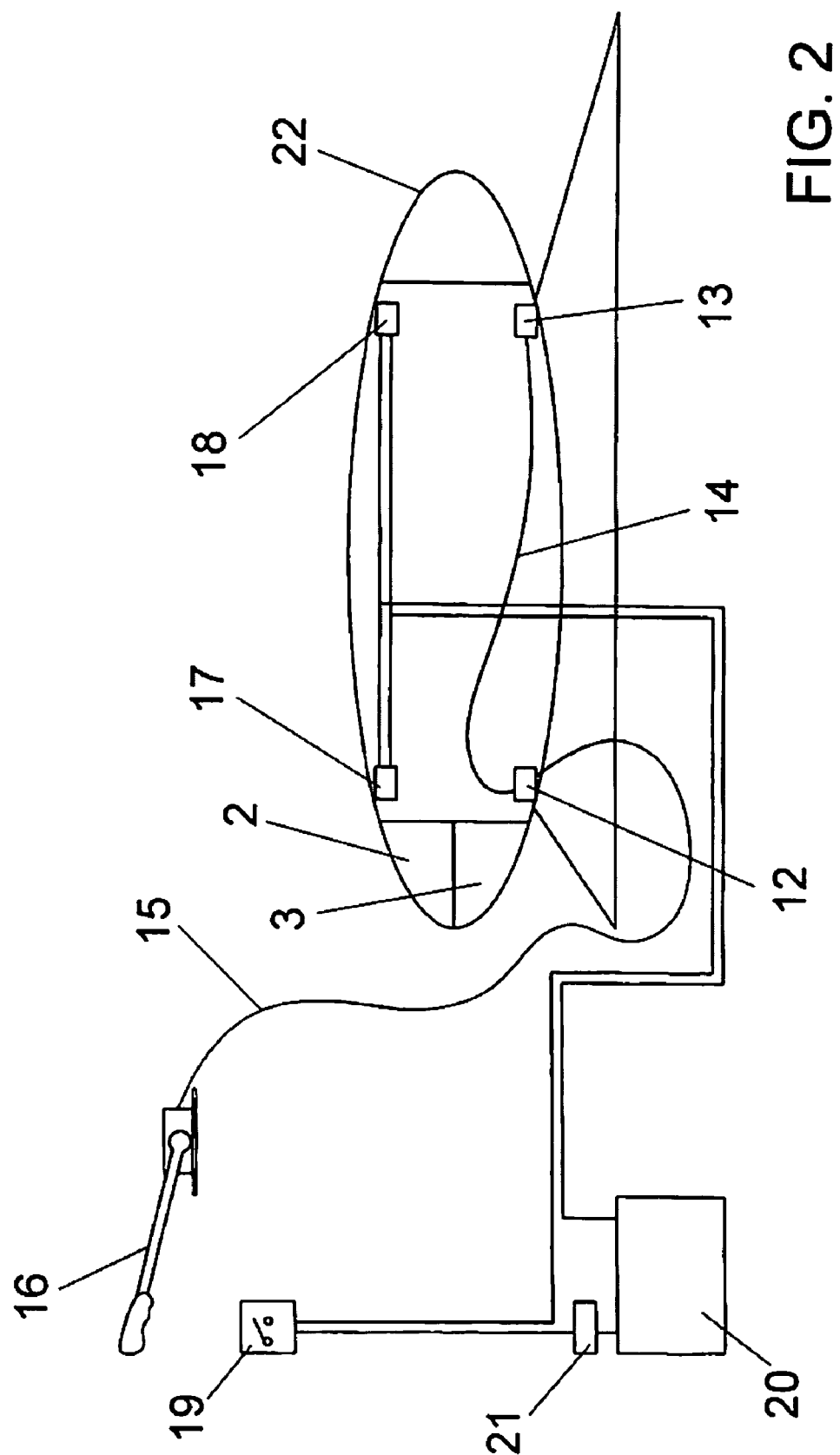
FIG. 2 also shows a schematic representation, the two possibilities of actuation of the recovery and rescue system, i.e. the manual and the automatic system.

As previously stated and represented in FIG. 2, the actuation of the system, i.e. the spreading of the sail, can be carried out manually or automatically.

In the manual opening system the covers (2) and (3) of the entrance portal are assisted by an opening mechanism (12), which can be actuated simultaneously with the opening mechanism (13) corresponding to the outlet nozzle (22) through a cable (14) which extends, with the collaboration of a section (15) of suitable length, towards a manual actuation lever (16) established in the cabin of the aircraft.

When the actuation is automatic, the covers (2) and (3) of the entrance portal and the outlet nozzle cap (22), are in turn assisted by respective electromagnetic opening mechanisms (17) and (18), which can be actuated simultaneously by a button (19), also located in the cabin of the aircraft, supply which is produced by a battery (20) assisted by a surge protector (21).

The aircraft will generally incorporate the two actuation systems, the automatic and the manual, normally being actuated by the former of the two, and using the manual system only in the event of failure of the automatic system.

Figure 3:
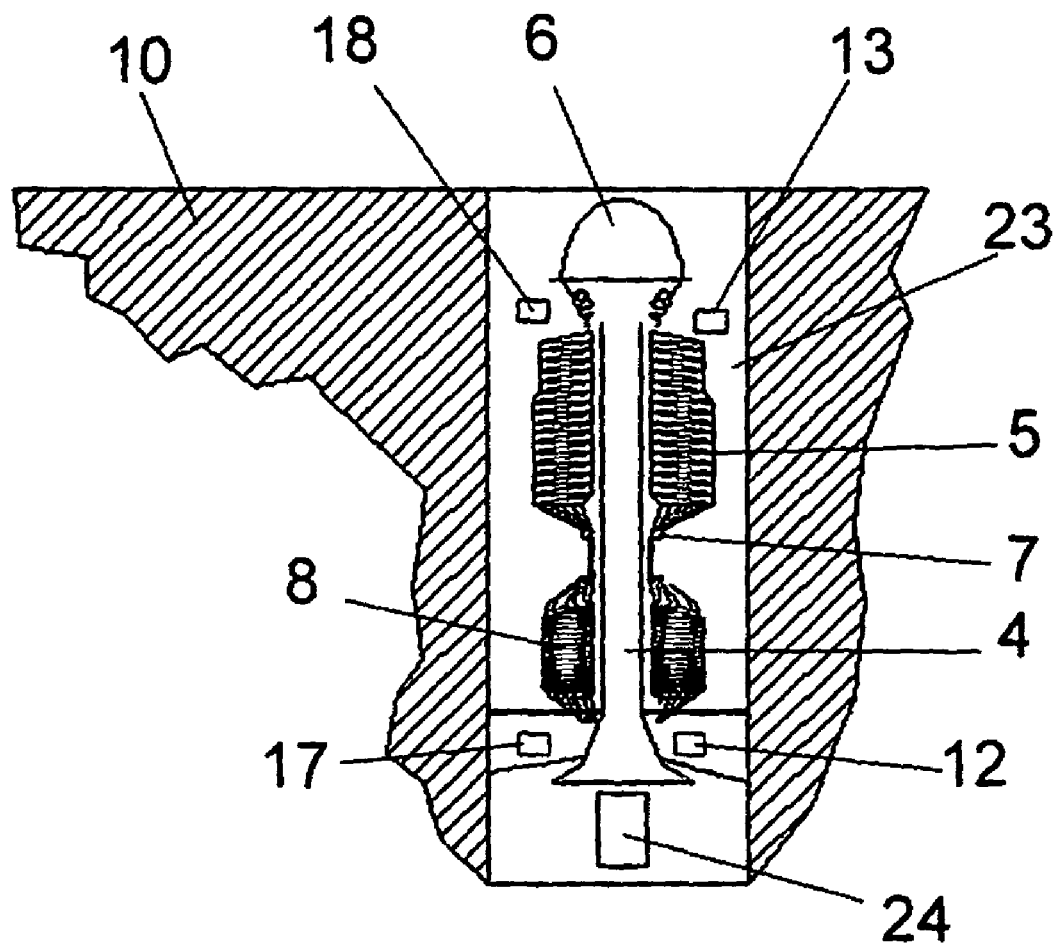
FIG. 3 shows a cross-sectioned close up of the recovery and rescue system installed inside the aircraft.

In the variant of embodiment shown in FIG. 3, the recovery and rescue system previously described is situated inside a housing or container (23) provided for this purpose in said aircraft, in whose case, corresponding to the front part facing the inlet of the spreader conduit (4) is included a compressed gas system (24), the outlet, as in the previous case, having the corresponding initiation system (6), so that when compressed air is propelled from the system (24), said air is projected at high speeds on the conduit (4) towards the outlet nozzle thereof, producing the inflation of the subsystem (6), being propelled to the exterior of the container or housing (23) by the force of the air sucked in, tensing said initiation subsystem (6) of the lift propulsion system or sail (5) itself, producing the extension thereof.

The remaining elements and components of this alternative embodiment are the same as those referred to for the system disclosed and represented in FIGS. 1 and 2.

The invention claimed is:

1. A recovery and rescue system for aircrafts comprising a spreader conduit with an inlet nozzle and an outlet nozzle, finishing off in correspondence with said outlet nozzle in an initiation subsystem, inflatable by the effect of air which penetrates the conduit through the inlet nozzle, and whose system is connected to a sail suitably folded around the conduit, characterized in that the spreading conduit wherein the inlet nozzle and the outlet nozzle are established is mounted inside a casing which is fused to the upper part of the fuselage of the aircraft, said casing which is elongated and adopts an ellipsoidal configuration, adapting to the nose cone of the aircraft with the collaboration of a support frame provided with a shroud, having been provided that the inlet nozzle is equipped with two covers, while the outlet nozzle is equipped with a single cover, covers which have corresponding opening mechanisms and which are actuated from the control cabin of the aircraft, and wherein the opening mechanisms are electromechanical, which are actuated by a button with the energy supplied by a battery; and wherein the sail is mounted on the spreading conduit and finishes off in a rigging duly fastened to the fixed structure of the system, which acts as a spacer between the sail and the aircraft, when the extension of said sail is produced.

2. The recovery and rescue system for an aircraft, according to claim 1, characterized in that the sail finishes off in an opposite direction to that of said initiation subsystem, in an annular lag catch, whereto the rigging is fastened, which is in turn fastened to a midpoint of the structure of the aircraft, in correspondence with a centre of gravity thereof.

3. The recovery and rescue system for an aircraft, according to claim 1, characterized in that the rigging is rolled up on the initial area of the spreading conduit.

4. The recovery and rescue system for an aircraft, according to claim 1, characterized in that the opening mechanisms are mechanical and are connected to a manual lever by means of cables.

5. The recovery and rescue system for an aircraft, according to claim 1, characterized in that the spreading conduit, with the sail, the initiation subsystem and the opening mechanisms, are mounted on a housing or container established on the aircraft itself; said rescue system comprises an air compressor system materialized in a tank wherein air is applied to the spreading conduit to extend the sail in correspondence with the frontal area of the inlet of the spreading conduit.

* * * * *